Figure 6:
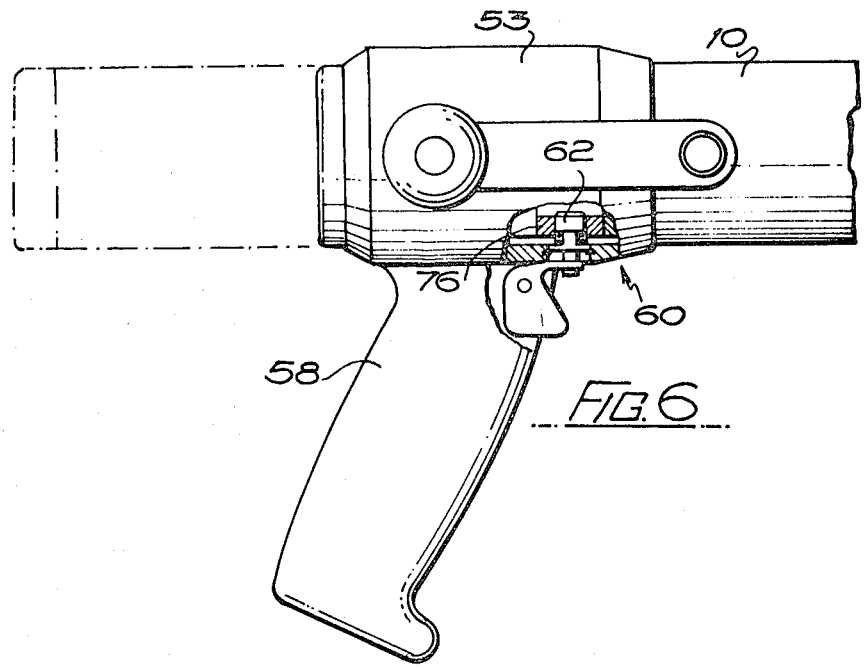

United States Patent [19]

Derbyshire

[11] 4,240,771
[45] Dec. 23, 1980

[54] BREAST DRILLS

[75] Inventor: George C. Derbyshire, Sheffield, England

[73] Assignee: The Jabobs Manufacturing Company, Ltd., Sheffield, England

[21] Appl. No.: 964,384

[22] Filed: Nov. 28, 1978

[51] Int. Cl.³ .................... B23B 39/10; B23B 39/00
[52] U.S. Cl. .................... 408/124; 408/241 R; 408/712
[58] Field of Search .................... 408/124, 241, 712

[56] References Cited

U.S. PATENT DOCUMENTS

| 913,172 | 2/1909 | Smith et al. | 408/124 |
| 1,251,133 | 12/1917 | Thiemer | 408/124 |
| 2,474,726 | 6/1949 | La Source | 408/124 |

FOREIGN PATENT DOCUMENTS

| 208249 | 5/1957 | Australia | 408/241 |
| 2000306 | 7/1971 | Fed. Rep. of Germany | 408/712 |
| 2462119 | 6/1976 | Fed. Rep. of Germany | 408/241 |
| 940285 | 5/1948 | France | 408/241 |

Primary Examiner—Harrison L. Hinson
Attorney, Agent, or Firm—Stephen J. Rudy

[57] ABSTRACT

A breast drill including a casing of elongate hollow form containing gearing for transmitting drive to a drill chuck, and a grip handle connected to the casing and capable of angular adjustment around the casing so that it can be located at a required position in relation to the position of a crank handle which can be turned to transmit drive to the chuck.

4 Claims, 12 Drawing Figures

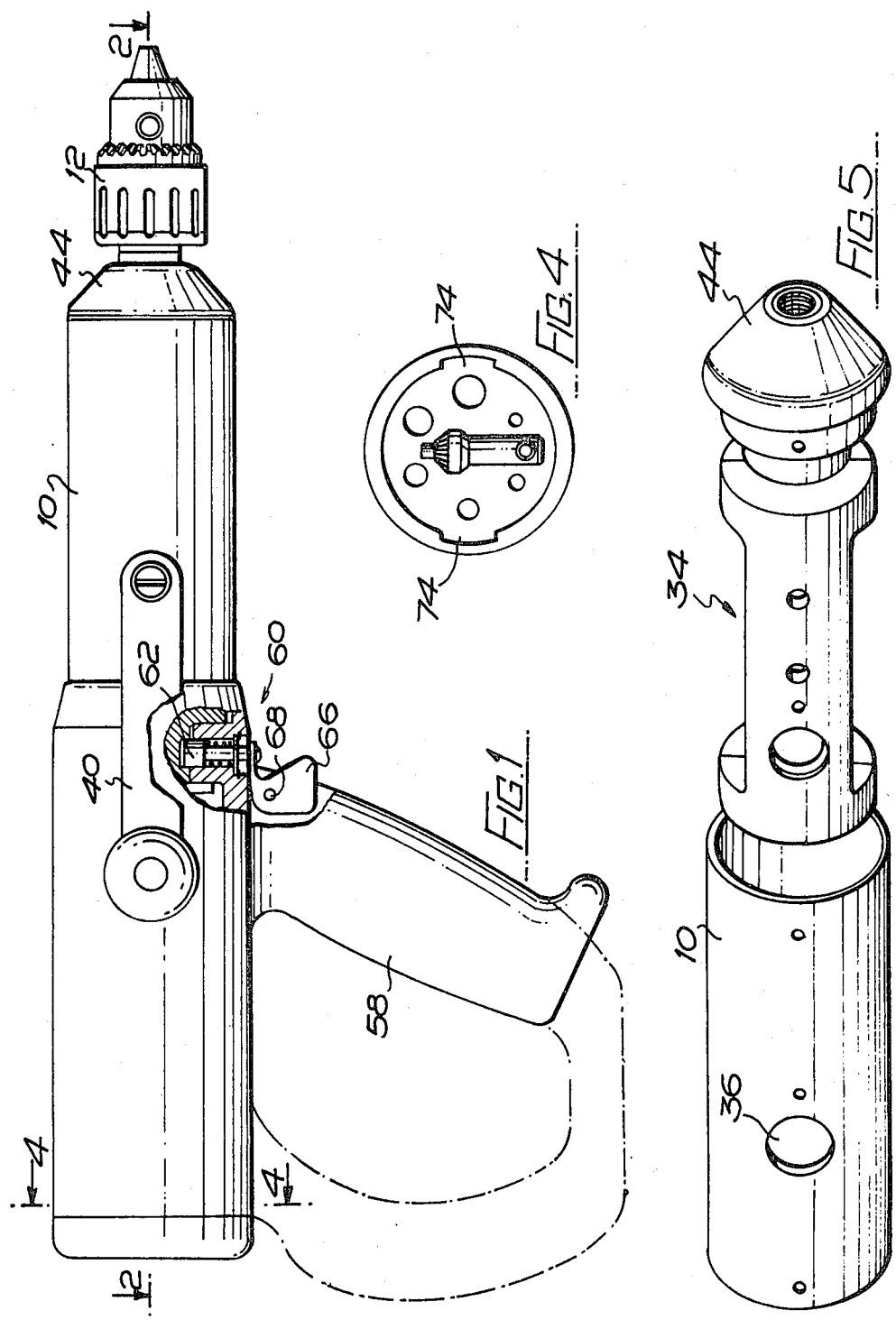

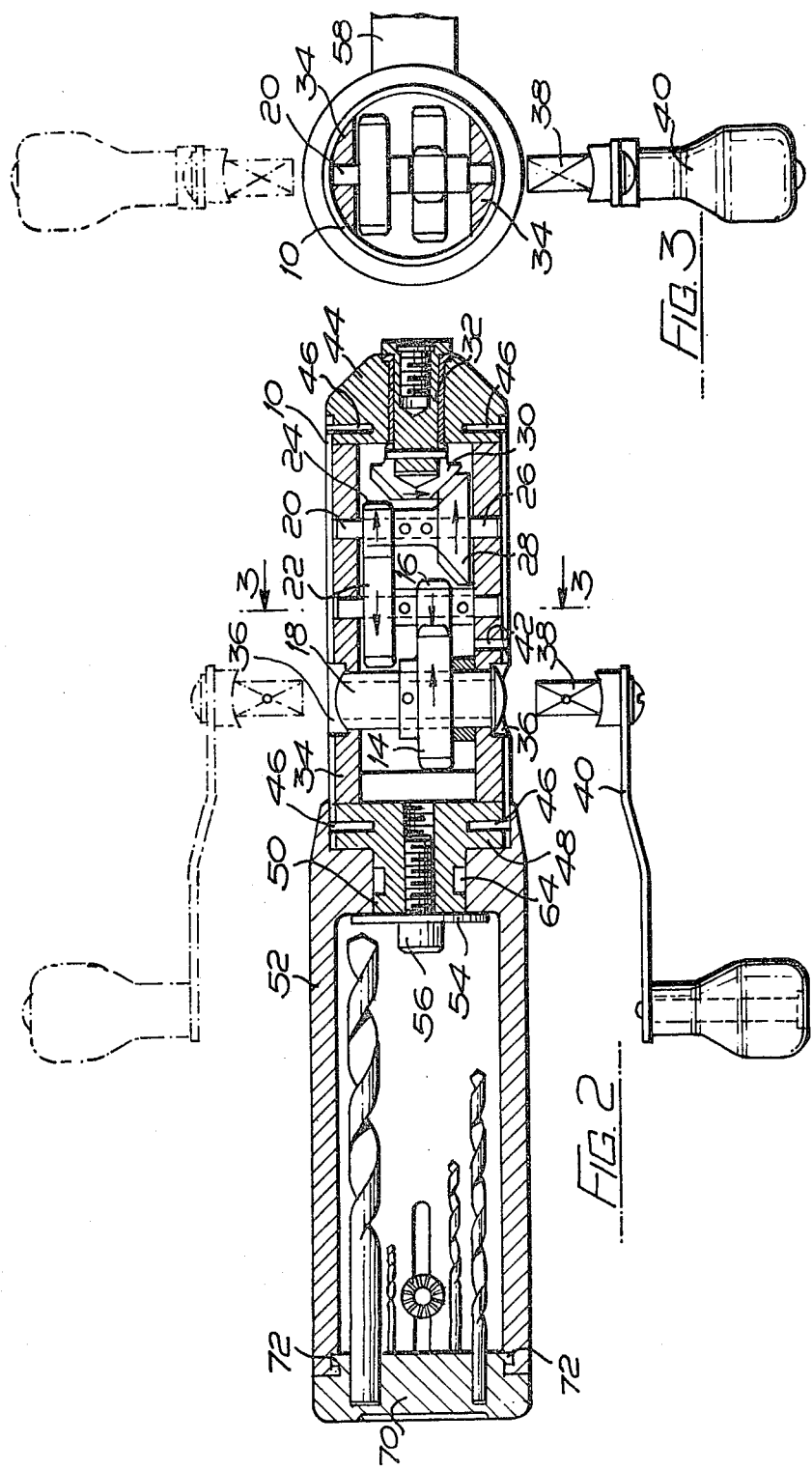

BREAST DRILLS

The invention relates to breast drills and has for its object to provide an improvement therein.

According to the invention, there is provided a breast drill including a casing of elongate hollow form containing gearing for transmitting drive to a drill chuck, a grip handle being connected to the casing and being capable of angular adjustment around said casing so that it can be located at a required position in relation to the position of a crank handle which can be turned to transmit drive to the chuck. The grip handle, which may be a pistol grip handle, will preferably be capable of being indexed around to a required one of a plurality of possible positions. On the other hand the grip handle may be connected to the casing by means of a friction grip locking arrangement so that stepless adjustment of the grip handle relative to the casing can be made and in this case the friction grip locking arrangement may be such that a longitudinal adjustment of the grip handle relative to the casing can also be made. A sleevelike extension may be rotatably mounted on the end of the casing remote from the drill chuck and in this case the grip handle may be formed integrally with said extension or may be removably connected thereto, conveniently by having dovetail and slot connection therewith. The sleeve-like extension will preferably be provided with an end cap into holes in which a selection of drill bits and the chuck key can be plugged so as to be contained within the extension. The crank handle will preferably be capable of being connected to either one of a pair of drive shafts which are accessible through apertures in the wall of the casing, depending upon whether a relatively low ratio or a relatively high ratio drive to the drill chuck is required. Said crank handle will preferably be capable of being connected to either end of the or each drive shaft to suit either a left handed or right handed person. The shafts by which the gearing is carried may be disposed in bores in a gearcase, in the form of two moulded halves, which has been inserted into the casing of elongate hollow form from one end of the latter.

In order that the invention may be fully understood and readily carried into effect, the same will now be described, by way of example only, with reference to the accompanying drawings, of which:

FIG. 1 is a side view, partly in section, of a breast drill embodying the invention, FIG. 2 is a sectional view on the line 2—2 in FIG. 1, FIG. 3 is a sectional view on the line 3—3 in FIG. 2, FIG. 4 is a sectional view on the line 4—4 in FIG. 1, FIG. 5 is an exploded perspective view illustrating the method of assembly of certain parts of the drill, and FIGS. 6 to 12 are views which will presently be referred to when describing possible modifications of the drill.

Referring now to FIGS. 1 to 5 of the drawings, the breast drill there illustrated includes a casing 10 of elongate hollow form which has been made from round steel tube. The casing includes gearing for transmitting drive to a drill chuck 12, said gearing including a first speed increasing spur gear and pinion pair 14 and 16 pinned on respective shafts 18 and 20; a second speed increasing spur gear and pinion pair 22 and 24, the gear 22 being pinned on the shaft 20 and the pinion 24 being pinned to a further shaft 26; and a bevel gear and pinion pair 28 and 30, the bevel gear being pinned on the shaft 26 and its mating pinion being pinned on one end of a driven shaft 32 the other end of which has a screwthreaded bore for the connection of the drill chuck.

As best shown in FIG. 2 the ends of each of the shafts 18, 20 and 26 are located in oppositely disposed bores in a synthetic plastics gearcase 34, moulded in halves, which has been inserted into the casing 10 from one end. The halves of the gearcase are located in alignment by the shafts and are held together by the casing 10. The gearcase is shown in the exploded view of FIG. 5 and from this view and FIGS. 2 and 3 the shape of the gearcase can readily be seen. The ends of the shafts 20 and 26 are hidden from view by the casing 10 but the ends of the shaft 18, which is the drive shaft of the drill, are aligned with apertures 36 in said casing. The shaft 18 has an aperture of square shape extending axially through it and the arrangement is such that a spigot portion 38 of a crank handle 40 can be inserted into either end of the aperture, as shown, for rotating the drive shaft 18 (the drill thus being adapted for use by either a right handed or a left handed person). The gearcase is axially located in the casing 10 by a pin 42 which extends through the wall of the casing and into the gearcase. A sleeved nose piece 44 in which the driven shaft 32 is mounted is retained at a forward end of the casing by a pair of oppositely disposed pins 46.

At the rearward end of the casing an end portion of an adaptor member 48 is retained in abutment with the adjacent end of the gearcase, as shown, by means of a further pair of oppositely disposed pins 46. A reduced diameter portion 50 of the adaptor member extends rearwardly beyond the end of the casing 10 and on it is rotatably mounted an end portion of a sleeve-like extension 52 a tapering skirt portion of which surrounds a rearward length of the casing. The sleeve-like extension is retained in position by a washer 54 and cap head screw 56.

A pistol grip handle 58 is moulded in a synthetic plastics material integrally with the sleeve-like extension 52 and the handle is provided with means whereby it can be indexed around to a required one of a plurality of possible positions relative to the casing, that is to say relative to the position in which the crank handle is to be used. Said means are constituted by detent mechanism generally indicated 60 in FIG. 1 and including a spring loaded plunger 62 which is slidably mounted in a radial aperture in the sleeve-like extension and which can be located in any one of a number of shallow holes 64 formed at the periphery of the reduced diameter portion 50 of the adaptor member. A trigger member 66 which is pivotally mounted at 68 in the handle is connected to an outer end of the plunger, as shown, so that said plunger can be withdrawn to allow the handle to be indexed around to a new position.

As shown in FIGS. 2 and 4, the sleeve-like extension is provided with an end cap 70 having a plurality of holes in which a selection of drill bits and the chuck key are plugged for insertion, as shown, in the hollow interior of the extension. The end cap 70 has been made of soft rubber (but it could of course equally well have been made of a soft synthetic plastics material for example) so that not only can the selection of drill bits and the chuck key be retained as shown in FIG. 2 by being plugged in their respective location holes, but to provide a comfortable breast pad by which additional end or axial force can be applied to the tool when drilling. The end cap is provided with oppositely extending retaining lugs 72 which can be passed through gaps 74 in the end of the extension, the end cap then being rotated relative to the extension to bring the retaining lugs into the retained position shown in FIG. 2.

Thus there is provided a breast drill which is not only of relatively simple construction but which is of very pleasing appearance. Furthermore, by virtue of the adjustments which can be made in the position of the pistol grip handle relative to the crank handle, and the fact that it can be used with equal facility by either a right handed or a left handed person, the drill is an extremely versatile tool.

However, various modifications may be made without departing from the scope of the invention. For example, in FIGS. 6 and 7 there is illustrated a breast drill which is identical to that described above except that the casing 10 extends further rearwards and the sleeve-like extension has been replaced by a much shorter sleeve 53 rotatably mounted on and partly surrounding the casing (but the shorter sleeve has been moulded integrally with a pistol grip handle 58 and the handle has the detent mechanism 60 as in the previously described drill). In addition, the adaptor member has been replaced by a coller 76 which has been fixed within the casing by means not shown and which has a series of radial holes 78 corresponding with radial holes in the casing in a selected one of which the plunger 62 of the detent mechanism can be located. A plain end cap 80 normally closes the end of the casing, as shown in full lines, but this can be replaced when desired by the extension piece shown in FIG. 8. The extension piece shown in FIG. 8 comprises a plug element 82 which can be entered into the end of the casing, a hollow sleeve 84 connected to the plug element, and a closure cap 86. (The interior of the extension piece could be used for containing a set of drill bits and the chuck key of course and in this case the closure cap could be provided with a number of holes for the selective fitment of the drill bits and of the chuck key. The closure cap will in any case preferably be made of a relatively soft material such as a soft rubber or a soft synthetic plastics material so that it can provide a comfortable breast pad by means of which additional end or axial force can be applied to the tool).

Figure 9:
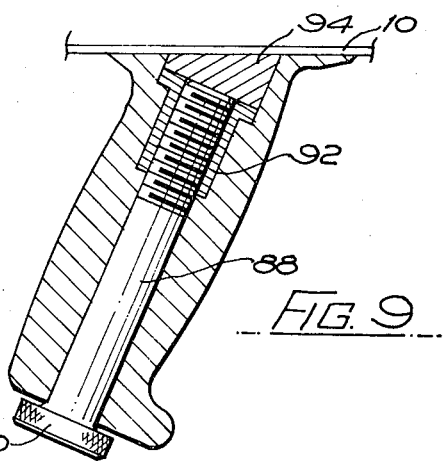

In FIG. 9 there is illustrated a modification which could be made to the construction of drill just described, the modification residing in the fact that instead of the handle being capable of being indexed around to a required one of the plurality of possible positions it is provided with a friction grip locking arrangement so that a stepless adjustment can be made. The friction grip locking arrangement includes a screw 88 which extends through the handle as shown. At one end the screw is provided with a knurled head 90 and at its other end its screwthreaded length extends through a screwthreaded insert 92 in the handle and abuts against a clamping block 94 bearing against the surface of the casing 10.

Figure 7:
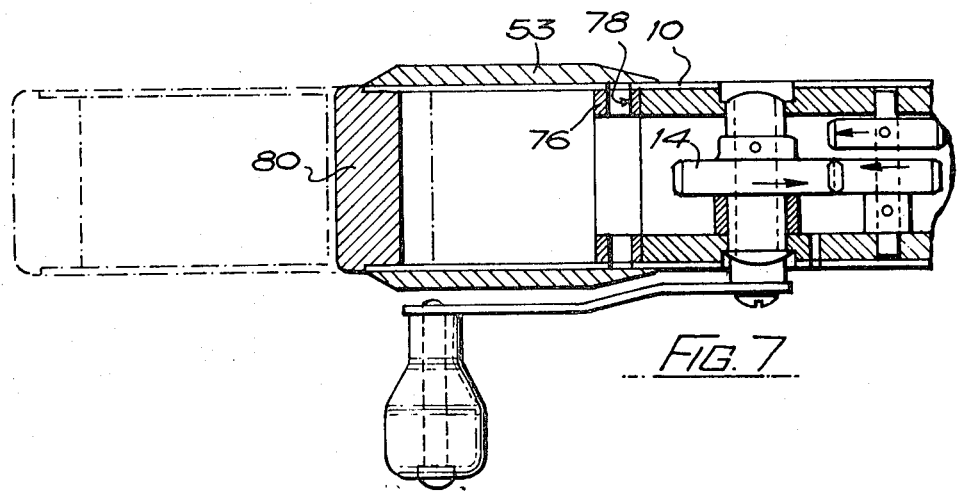
Figure 8:
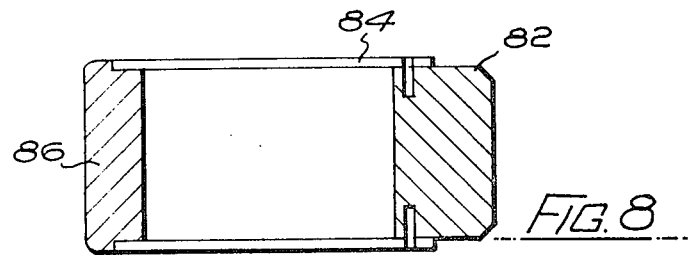
Figure 10:
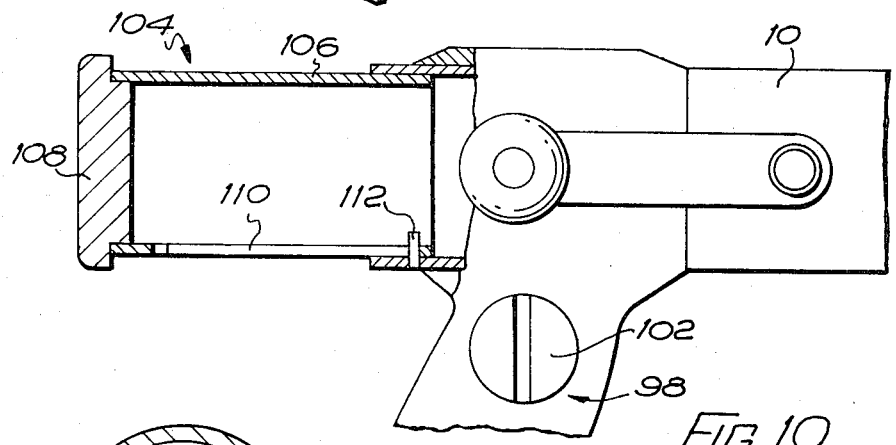
Figure 11:
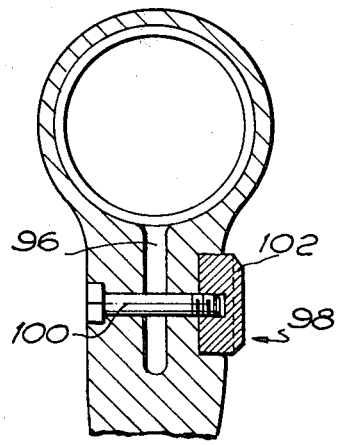
Figure 12:
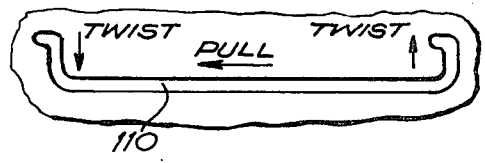

In FIGS. 10 to 12 there is illustrated a further possible modification of the drill of FIGS. 6 and 7 in which the handle is again capable of being adjusted in a stepless manner. In this case, however, the handle has been moulded with a central slot 96 in the region where it merges with its integral moulded sleeve, as shown in FIG. 11, and a manually operable clamping device generally indicated 98 is provided for tightening the sleeve upon the casing 10. The manually operable clamping device is constituted by a screw 100 which extends nonrotatably through the slotted portion of the handle and engages a blind nut 102 which is of relatively large diameter and formed with a diametrically extending projection so that it can be turned quite easily by hand. It will be understood that this modified form of drill, and the modification illustrated in FIG. 9, has the advantage that not only can the handle be angularly adjusted in a stepless manner to bring it into a required position relative to the crank handle to suit the user but also that it can also be steplessly adjusted longitudinally of the casing. In fact, if the user desires, he can remove the handle from the drill if this will allow him easier access to a difficult to reach position, and of course in this case he will grip the rear end of the casing to maintain control and resist torque reaction.

In addition, the casing 10 of the drill illustrated in FIGS. 10 to 12 has been provided with a telescopic extension piece generally indicated 104 (which could of course equally well have been incorporated in the drill illustrated in FIGS. 6 and 7). The extension piece 104 comprises a sleeve 106 and a closure cap 108, the sleeve having an axially extending slot 110 with angled ends as shown in FIG. 12, which is engaged by a pin 112 projecting inwards from the casing 10. (The closure cap 108 will of course again preferably be made of a relatively soft material so that it can provide a comfortable breast pad when the tool is being used as a breast drill). The arrangement is such that the extension piece can be either located in the position in which it is shown in FIG. 10 or can be retracted into the casing at will.

Various other modifications may be made without departing from the scope of the invention. For example, although in each of the illustrated embodiments the casing has been made of round steel tube this is not essential; the casing could for example be made of drawn steel tube of square or hexagonal section, the gearcase 34 being modified accordingly. It will also be understood that the casing may be made of any suitable metal or indeed could be made of a suitable synthetic plastics material. Similarly, the halves of the gearcase could be made by die-casting, in aluminium or white metal for example. Furthermore, the shaft 20 could be modified and the casing 10 be suitably apertured so that said shaft could be driven directly by the crank handle. In this way the drill could be made a two-speed drill (the overall gear ratio possibly being modified accordingly so that the high speed drive would be at a somewhat higher ratio than in the arrangement illustrated in FIG. 2). The driven shaft 32 could be adapted for the connection of any kind of drill chuck, that is to say it may have either an internal or external thread or taper. The pistol grip handle could of course be formed separate from the sleeve-like extension, in FIGS. 1 to 4, and separate from the shorter sleeve and in this case could have dovetail and groove connection therewith. Furthermore, as shown in chain-dotted lines in FIG. 1, the pistol grip handle could be replaced by a dual duty type of handle which would give the user a choice of grip portions and extend the maximum reach of the tool. This type of handle also could be either formed integrally with the sleeve-like extension or formed separately therefrom and have dovetail and groove connection with it.

What I claim and desire to secure by Letters Patent is:

1. In a breast drill, a casing of elongate hollow form containing gearing for transmitting drive to a drill chuck, a crank handle which can be turned to transmit drive to the drill chuck, a pistol grip handle connected to the casing and being capable of angular adjustment around said casing so that it can be located at a required position in relation to the position of the crank handle, and a sleeve-like extension rotatably mounted on the end of the casing remote from the drill chuck and the pistol grip handle is formed integrally with said extension.

2. A breast drill according to claim 1, in which the sleeve-like extension is rotatably mounted on the end of the casing remote from the drill chuck and the pistol grip handle is removably connected to said extension.

3. A breast drill according to claim 2, in which the pistol grip handle is removably connected to the sleeve-like extension by having dovetail and slot connection therewith.

4. A breast drill according to claim 1, in which the sleeve-like extension is provided with an end cap into holes in which a selection of drill bits and the chuck key can be plugged so as to be contained within the extension.

* * * * *